Jan. 29, 1957 R. C. ZEIDLER 2,779,292
HYDRODYNAMIC COUPLING
Original Filed Dec. 31, 1948 2 Sheets-Sheet 1
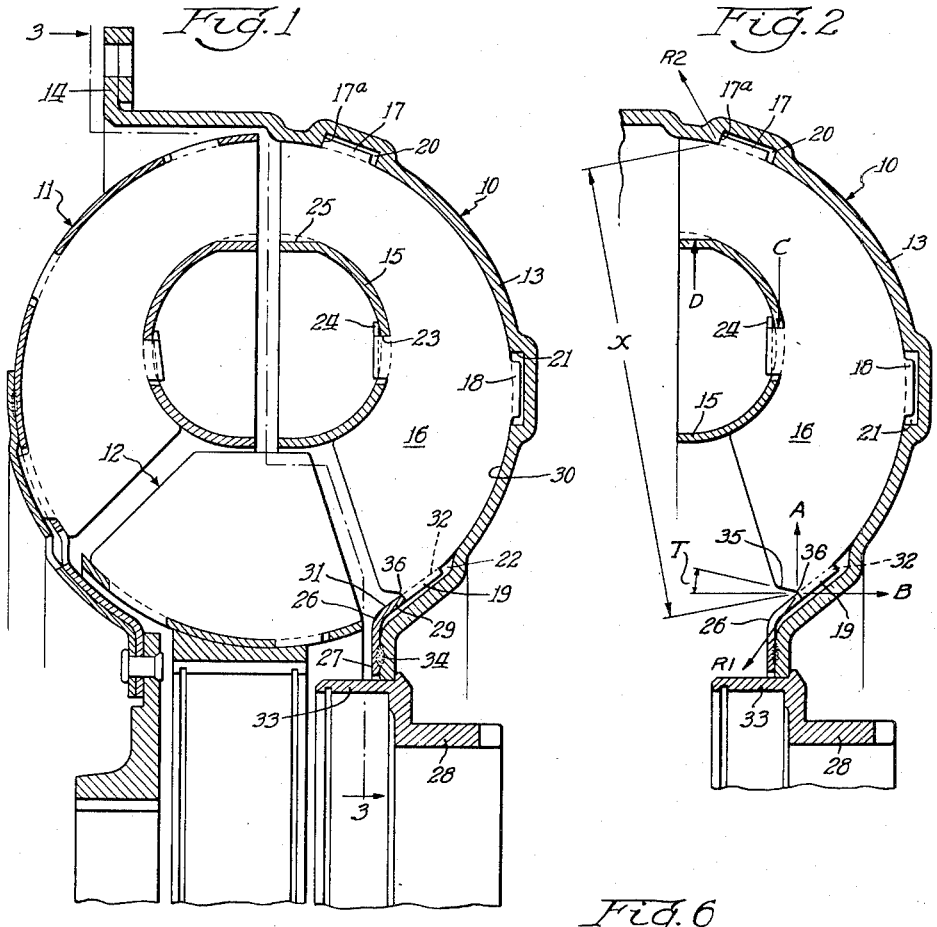
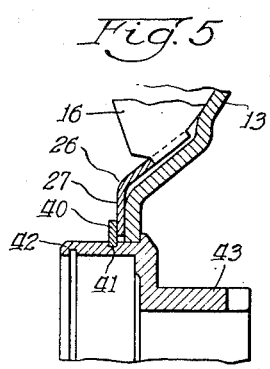
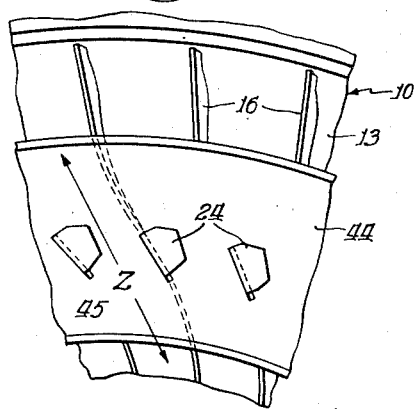
Inventor:
Reinhold C. Zeidler
By: H. J. Schmid
Atty.

Inventor:
Reinhold C. Zeidler

United States Patent Office 2,779,292
Patented Jan. 29, 1957

2,779,292

HYDRODYNAMIC COUPLING

Reinhold C. Zeidler, Detroit, Mich., assignor to Borg-Warner Corporation, Chicago, Ill., a corporation of Illinois Original application December 31, 1948, Serial No. 68,691. Divided and this application February 27, 1952, Serial No. 273,725

4 Claims. (Cl. 103—115)

This invention relates to hydrodynamic coupling devices for transmitting variable torque through vaned elements placed adjacent each other and operating by toroidal circulation of fluid in a closed toroidal circuit. This application is a division of my co-pending patent application, Serial No. 68,691, filed December 31, 1948 now abandoned.

An object of the invention is the provision of an improved vaned element of a hydrodynamic coupling device, which vaned element is simple and rugged in construction, light in weight, efficient in operation, and easy and inexpensive to fabricate.

Another object of the invention is to provide a novel and improved method of fabricating a vaned element of a hydrodynamic coupling device wherein the component parts of the element may be preferably formed of sheet metal stampings including means for facilitating the ready location and assembly of the vanes with the other parts of the element.

A further object of the invention is to provide an improved vaned element of a hydrodynamic torque-multiplying coupling device and a method of fabricating the vaned element wherein curved vanes are formed of material having inherent resiliency whereby the vanes can be flexed in their assembly with the other parts of the element to obtain a tight fit between the parts of the element.

Another object of the invention is to provide an improved arrangement and method for connecting the curved vanes with the casing and core ring of a hydrodynamic coupling element of the torque-multiplying type so that the assembly will present the necessary strength to withstand the pressure of the circulating fluid on the vanes during multiplication of torque.

Still another object of the invention is to provide a vaned element for a hydrodynamic torque converter and the method of making the same in which curved resilient vanes of sheet metal are formed with mounting portions adapted to cooperate with other parts of the element to position the vanes with their curvatures in a desired relationship during toroidal circulation of the fluid in the converter and to provide for the smooth fluid flow between the vanes along the inner surfaces of the vaned element for the efficient operation of the converter.

A further object of the invention is to provide a vaned element for a hydrodynamic torque-multiplying device and method of fabricating the same, in which the vanes are maintained in assembly with the casing and core ring of the element by means of a retaining member adapted to retain the vanes under compression or preload so that they are firmly held in the casing, the vanes being preferably made of flexible sheet metal so that preloading of the vanes by the retainer member will insure a tight fit with the casing member of the vaned element, the longitudinal resiliency of the curved vanes being effectively utilized in this connection.

These and other objects and features of the invention will become apparent from the following description when taken together with the accompanying drawings, in which:

Figure 1 is an axial section of a fragmentary portion, preferably the upper half of the elements of a hydrodynamic coupling device;

Fig. 2 is another view of one of the elements shown in Fig. 1 and embodying the present invention;

Fig. 5 is a fragmentary section showing a modification for holding the vanes in place;

Fig. 6 is a fragmentary front elevation of a modification of the assembly shown in Figs. 1–3.

The drawings are to be understood as being more or less of a schematic character for the purpose of disclosing a typical or preferred form of the improvements contemplated herein, and in these drawings like reference characters identify the same parts in the different views.

Figure 3:
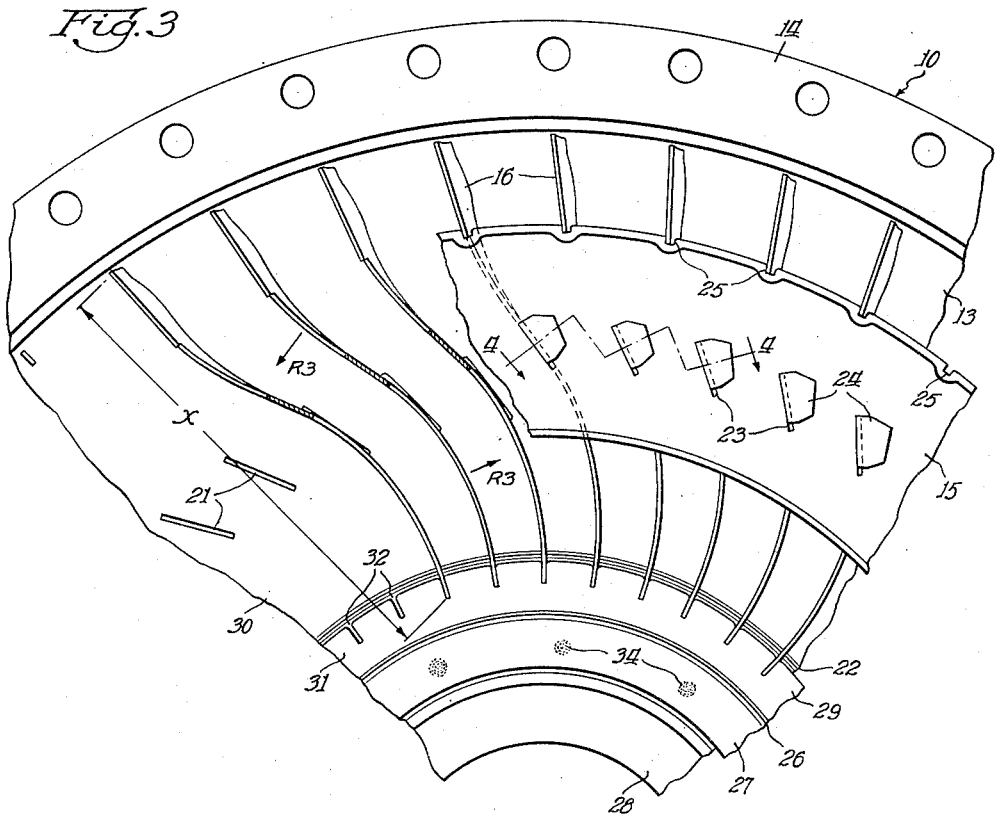
Fig. 3 is an elevational view of the element shown in Fig. 2 and as seen from the left in Fig. 2.

Referring now to Fig. 1 of the drawings, the illustrated hydrodynamic coupling device is of the torque-multiplying type and comprises a fluid impeller or driving element 10, a turbine or driven element 11, and a stator element 12. These elements of the hydrodynamic coupling device function to multiply the torque between an input member and an output member, respectively, secured to the impeller 10 and the turbine 11, all of the elements for this purpose having vanes, each of which are provided with a curvature such that the vanes are capable of providing a toroidal circulation of fluid in the device wherein the vanes of the impeller 10 impart energy to a body of fluid within the coupling device and the turbine element 11 receives the energy from the fluid, the stator element 12 having curved vanes cooperating with the curved vanes of the impeller and the turbine element and having a reaction force impressed thereon by the fluid, the stator element being held from rotation by a one-way clutch during the multiplication of torque by the hydrodynamic coupling device and functioning as a reaction element to change the direction of flow of the fluid so that the coupling functions to multiply torque.

Hydrodynamic coupling devices of the type described are used in various industrial and automotive applications, such as in combination with transmission gearing of automotive vehicles, and are required to provide a certain torque-multiplication ratio dependent upon the torque transmitted by the power means and to be delivered to the load, which in the case of automotive vehicles is the engine and the driving wheels, respectively. The torque-multiplying characteristics of a hydrodynamic coupling device are controlled by the curvature of the vanes of the impeller, turbine, and stator elements and, for this purpose, to obtain a desired torque-multiplication ratio of the device, the maintenance of the curvature of the vanes of these elements is critical to the correct operation of the device. Due to this factor, the vanes of each element must be firmly fixed and positively held against displacement in each of the assembled elements. It has been recognized that devices wherein the various component parts of the hydrodynamic coupling element are formed of thin sheet metal stampings afford maximum economy in the manufacture of such devices.

The present invention is directed to providing an improved vaned element of a hydrodynamic coupling device, wherein the component parts of the element are formed of sheet metal stampings and wherein thin curved vanes are firmly secured to the other parts of the element, while the vanes are maintained with their curvatures in the correct positions for obtaining desired torque-multiplying characteristics. As an example of a vaned element having these desirable features and referring to the drawings, the vaned impeller element 10 comprises a hollow, substantially semi-toroidal casing or shell 13 as shown in Figs. 1 and 2, the casing 13 being preferably made of sheet metal, such as steel. The casing 13 of the impeller 10 further comprises the turned-over radially extending outer flange 14 adapted to be attached to power means, such as an automobile engine flywheel (not shown), and this outer flange provides substantial stiffness to resist distortion which might result in leakage through the gasket between it and the engine flywheel. The impeller 10 also comprises a hollow, substantially semi-toroidal core ring 15 formed of sheet metal, such as steel. A plurality of vanes 16 of sheet metal, preferably steel, tempered to have some inherent springiness, are formed, prior to assembly with the casing and core, with a curvature which may be variously defined as a compound, ogee, or reverse curve instrumental in controlling the proper toroidal flow of fluid through the passages defined by the vanes of the impeller element for torque-multiplying purposes.

Figure 4:
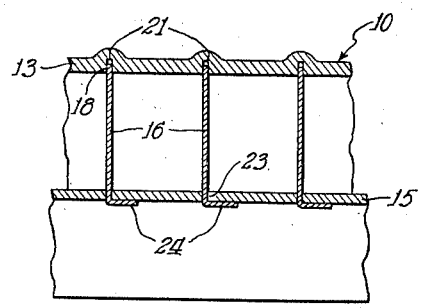
Fig. 4 is a fragmentary section taken on line 4—4 of Fig. 3.

Referring to Figs. 1 to 4 of the drawings, the present invention contemplates the assembly of the vanes 16 with the casing 13 and the core ring 15 to provide a unitary structure wherein the vanes are firmly secured to and held by the casing 13 and core ring 15 in positions wherein the curvatures of the vanes are effectively maintained to control the toroidal circulation of fluid for obtaining the desired torque-multiplying characteristics of the coupling device.

For this purpose, each of the vanes 16 is substantially semi-circular in shape to fit within the semi-toroidal casing 13, the outer peripheral edge of each vane being arcuate for engagement with the complementary internal surface of the casing 13. Each vane 16 is also provided with three tabs 17, 18 and 19 extending radially outwardly of the outer margin of the vane, the tabs 17 and 18 of each vane fitting into suitable holding means or seats 20 and 21 respectively, in the casing 13 the seats 20 being circumferentially spaced about the casing 13 and in radially spaced relation to the circumferentially spaced seats 21. The holding means for the vanes that are herein called seats may be slots, recesses, lugs, notches and the like. The tabs 19 extend within an offset region 22 of the casing at the radially inner portion thereof. It may be noted from a consideration of Fig. 3 that the tabs 17, 18 and 19 on each vane are disposed in radial planes spaced from each other due to the curvature of the vane which necessitates the careful location and dimensioning of the seats 20 and 21 in the casing 13 so that the curvatures of the vanes will not be substantially changed in the assembly of the vanes with the casing 13. The means for attaching the core ring to the vanes also assist in maintaining the proper curvatures of the vanes in the assembled structure, the core ring, for this purpose, being provided with circumferentially spaced slots 23 in its mid-section for receiving tabs 24 on the inner margins of the vanes and each of these tabs is of sufficient length so that it can be folded or rolled down flat against the inner curved surface of the core ring to lock the core ring to the vanes, the outer periphery of the core ring is provided with seats in the form of circumferentially spaced notches 25 with each notch 25 engaging a portion of the adjacent terminal edge of a vane to further insure prevention of relative movement between the vanes of the core ring during operation of the coupling device.

To maintain the tabs 17 and 18 of the vanes 16 engaged with the seats 20 and 21 of the casing and thereby the vanes in assembly with the casing 13, a retaining ring 26 is provided to retain the vanes under compression or preload so that they are firmly held and locked in place in the housing or casing 13, after the vanes have been inserted in the casing. More specifically, the retaining ring 26 comprises an annular member which is angular in cross-section, as shown in Figs. 1 and 2, for the purpose of closely following the contour of the radially inner end of the casing 13 so that there will be a smooth fluid flow between the vanes along the inner surface of the casing to insure the efficient operation of the hydrodynamic coupling device. To this end, the ring 26 has one of its angularly disposed portions 27 formed flat for engaging the complementary flat surface of the radially inner end of the casing 13 mounted on a hub 28, and the other angularly disposed portion 29 is positioned within the offset region 22 of the casing and is cone-shaped to conform to the inner surface thereof. It may be noted that the inner surface 30 and 31 of the casing and retainer, respectively, are disposed in the same plane to provide a substantially continuous area to the fluid passing between the vanes to insure the smooth flow of the fluid along these surfaces. The portion 29 of the retainer ring 26 has a series of seats 32 in its edge receiving the tabs 19 of the vanes when the retainer ring is positioned on the annular flange 33 of the hub 28. Upon movement of the ring toward and into engagement with the casing 13, the radially inner ends of the slots 32 engage the ends of the tabs 19 of the vanes to urge the tabs 17 of the vanes into engagement with ends 17a of the slots 20 in the casing 13 to place the flexible vanes under compression or preload so that they are firmly held in the casing 13. The portion 27 of the retainer ring 26 is spot-welded as at 34, to the casing 13 thereby being made integral with the casing 13.

Referring now to Fig. 2 illustrating the various forces set up in the impeller element 10, assembled as described, the principal dimension of each of the vanes is that indicated by the letter X. The dimensions of each notch 20 in the casing and each slot 32 in the retaining ring 26 are such that the distance X between these points is slightly less than this similar distance measured on the vane. In the assembling of the impeller element 10 as described, each of the vanes 16 is positioned within the casing or housing 13, with the outer tab 17 of the vane received within one of the notches 20 of the casing, the middle tab 18 of the vane engaged with a notch 21 of the casing, and finally the retainer ring 26 is slipped over the annular flange 33 of the hub 28 and moved toward the casing 13 to dispose the tabs 19 of the vanes within the slots 32 in the retainer ring. In this latter operation, it may be noted that the lower edge of each of the vanes is tapered as indicated at T so that this tapered edge 35 and the adjacent edge of the tab define a reflex angle, providing a shoulder 36 at the intersection of the edges. When the retainer ring is moved toward the casing 13, the bottom of the slots 32 in the retainer ring 26 will engage the tapered edges 35 of the vanes and slide there along until the bottom of the slots 32 of the retaining ring engage the shoulders 36 of the tabs 19, and the angularly disposed portion 27 of the retainer ring 26 is then spot-welded to the casing 13.

The assembly of the retainer ring 26 with the vanes 16 and casing 13 in the manner described will set up a radial force in each of the curved flexible vanes in the direction indicated at A, an axial force in the direction indicated at B, and a resulting force in the direction indicated at R1. The reaction of the force R1 is taken in a direction indicated at R2 on the tab 17 of the vane engaged at 17a with an end of the outer notch 20 in the casing to tightly maintain the same in engagement. These forces will not have any effect on the tab 18 of the vane in the notch 21 of the casing 13 inasmuch as this tab and notch are only for the purpose of preventing sidewise movement of the vane by the pressure of the fluid circulating in the coupling during operation thereof. The vanes are thus maintained under compression and are uniformly preloaded, by the retainer ring setting up radial and axial forces through dimensional interference, while taking advantage of the longitudinal resiliency in a curved vane of the type disclosed. It may be noted that by using the retainer ring, in the manner described, to preload the vanes, the longitudinal resiliency and the considerable curvature of the vanes will cause any endwise loading simply to slightly increase the curvature of the vanes in the directions indicated by the arrows R3—R3 in Fig. 3, such increased curvatures being negligible with respect to affecting the predetermined torque-multiplying ratio characteristic of the vane of the hydrodynamic torque-converting device. The preloading of the vanes in the manner described insures the vanes being firmly secured to and held by the casing 13 and retainer ring 26 and is also beneficial in preventing rattling or vibrating of the vanes with respect to the casing 13.

To eliminate any tendency toward vibration or rattle of the vanes 16 with respect to the core ring 15, the dimensions and contours of the vanes and core ring are such that the core ring 15 fits tightly against the outer edge of the tab 24 of each vane for the purpose of setting up a slight inward radial force indicated at C. Also, a radial outward force indicated at D is set up by virtue of the diameter of the core ring at this point being slightly greater than the diameter of the recesses formed in the inner edges of the vanes which causes a slight distortion in the core ring between the points C and D for the purpose of preloading the vanes and core ring to prevent vibration and rattle between the vanes and the core ring.

The modification illustrated in Fig. 5 contemplates the retainer ring 26 being held with its portion 27 tightly engaged with the radially inner end of the casing 13 by means of a snap ring 40 disposed within a groove 41 in the outer surface of the annular flange 42 of a hub 43. The snap ring 40 and the groove 41 in the hub 43 thus provide an alternate method of holding the retainer ring 26 in a position to preload the vanes 16 as previously described.

The modification illustrated in Fig. 6 contemplates the assembly of the vanes 16 with a core ring 44, wherein the radial distance between the axis of the vaned element 10 and the outer surface of the ring at the radially outer edge of the ring is greater than the radial distance between the axis of the vaned element 10 and the arcuate inner edge of the vanes adjacent the radially outer straight edge of the vane as indicated at Z, so that when the tabs 24 of the vanes 16 are received within the slots 45 of the core ring 44 and the core ring is moved toward the vanes, pressure must be exerted to cause the external curved surface of the core ring 44 to engage the complementarily arcuate edges of the vanes 16, setting up considerable friction between the outer surface of the core ring and the arcuate inner edges of the vanes which will be maintained upon bending the tabs 24 of the vanes over and against the inner surface of the core ring 44. It may be noted that the tabs 24 on the vanes are not engaged with the ends of the slots 45, as it has been determined that a radial outward force (indicated at D in Fig. 2) will provide a sufficient frictional engagement of the vanes and core ring to dampen out any tendencies for the vanes to vibrate, for example, when the fluid in the hydrodynamic coupling device might be cavitating, whereby vibration of the vanes causing loosening of the vanes in time will be prevented. It may be noted this method of assembling the vanes and core ring differs from that previously shown and described as, in the modified arrangement shown in Fig. 6, the vanes are so firmly engaged with the core ring that the provision of notches in the core ring to engage the vanes is not required.

I wish it to be understood that my invention is not to be limited to the specific construction of the hydrodynamic coupling element and to the specific methods for making the same which are shown and described, except only insofar as the claims may be so limited as it will be apparent to those skilled in the art that changes may be made without departing from the principles of the invention. Furthermore, I wish it to be understood that, although the embodiments of the invention illustrated are in connection with an impeller element, the invention is not to be limited to an impeller element to the exclusion of driven and stator elements in a hydrodynamic coupling, unless the claims are so limited.

I claim:

1. In a vaned element of a hydrodynamic coupling of the torque-multiplying type, the combination of a hollow, substantially semi-toroidal casing; a plurality of radially spaced semi-circular curved vanes fitting within said casing, each vane being curved in the direction of its thickness; means securing said vanes to said casing; a hollow, substantially semi-toroidal sheet metal core ring engaging the inner edges of said vanes and having a plurality of circumferentially spaced slots intermediate its opposite edges and also circumferentially spaced seats on its outer surface adjacent one edge thereof engaging edges of said vanes; tabs on said vanes extending into said slots and engaging the inner surface of said core ring, the arcuate inner edge of each vane being of less diameter than that of the outer surface of the core ring between its engagement with the seat on said core ring and the tab thereof and the linear distance between the end of the slot of the core ring, engaged by the tab, and the slot of the core ring engaged by said edge of said vane, being greater than the linear distance between the vane tab and said vane edge to provide forces placing said core ring under compression and slightly distorting the core ring to reduce its outer diameter to prevent vibrating movement of said vanes relative to said core ring.

2. In a vaned element of a hydrodynamic coupling of the torque-multiplying type, the combination of a hollow, substantially semi-toroidal casing; a plurality of radially spaced semi-circular curved vanes fitting within said casing; means securing said vanes to said casing; a hollow, substantially semi-toroidal core ring of distortable material tightly engaging the surface of the inner edges of said vanes; and means for maintaining said vanes and core ring in assembled relation including slots in said core ring receiving tabs on said inner edges of said vanes, the arcuate surfaces of the inner edges of said vanes having less diameter than the engaged arcuate surface of the core ring to distort said core ring and to urge said vane tabs forcibly into engagement with ends of said slots to provide an inwardly directed radial force and an outwardly directed radial force at the respective points of engagement of the tabs with the ends of the slots to maintain said core ring engaging said inner edges of said vanes with sufficient frictional force to prevent vibrating movement of said vanes relative to said core ring.

3. In a vaned element of a hydrodynamic coupling of the torque-multiplying type, the combination of a hollow, substantially semi-toroidal casing; a plurality of radially spaced semi-circular curved vanes fitting within said casing; means securing said vanes to said casing; and a hollow, substantially semi-toroidal core ring of distortable material engaging the inner edges of said vanes and having a plurality of circumferentially spaced slots, said vanes having tabs extending into said slots and engaging the inner surface of said core ring, the linear distance between the ends of the inner curved edges of said vanes being less than the linear distance between the portions of the core ring engaged thereby and the arcuate inner edge of each vane having a radius smaller than the radius of the curved engaged outer surface of the core ring, whereby an end of each slot in said core ring tightly engages the outer edge of the associated tab on each vane disposed between the edges thereof and provides a slight inward radial force at the point of engagement, and whereby a radial outward force is provided at the point of engagement of the ends of the inner curved edges of said vanes and the portions of the core ring engaged thereby, said forces causing a slight distortion in the core ring between said points of engagement for the purpose of preloading said vanes and said core ring to prevent vibration and rattle.

4. In a vaned element of a hydrodynamic coupling device of the torque-multiplying type, the combination of a hollow casing having a substantially semi-toroidal inner surface; a plurality of substantially semi-circular curved vanes of sheet metal in said casing; means securing said vanes to said casing; a substantially semi-toroidal core ring having circumferentially spaced slots intermediate the edges thereof and circumferentially spaced notches in the outer surface thereof at one edge thereof, disposed perpendicular to said one edge, and each having a width substantially the thickness of each vane; tabs on the inner edges of said vanes extending through said slots in said core ring and engaging the inner surface thereof; other tabs on the inner edges of said vanes received within said notches in said core ring, said vanes being curved in the direction of their thickness and each of said other tabs being disposed out of the plane of its vane for reception in the associated notch in said core ring, the arcuate inner edge of each vane having a radius smaller than the radius of the curved engaged outer surface of the core ring, whereby an end of each slot in said core ring tightly engages the outer edge of the associated tab on each vane disposed intermediate the edges thereof and provides a slight inward radial force at the point of engagement, and whereby a radial outward force is provided at the point of engagement of the tab on each vane engaged with the associated notch in said core ring, said forces causing a slight distortion in the core ring between said points of engagement for the purpose of preloading said vanes and core ring to prevent vibration or rattle.

References Cited in the file of this patent

UNITED STATES PATENTS

| | | |
|---|---|---|
| 1,915,640 | Alsaker | June 27, 1933 |
| 2,031,521 | Baumann | Feb. 18, 1936 |
| 2,205,054 | Wemp | June 18, 1940 |
| 2,236,130 | Bechbenner | Mar. 25, 1941 |
| 2,336,231 | Dodge | Dec. 7, 1943 |
| 2,429,503 | Zeidler | Oct. 21, 1947 |
| 2,357,295 | Thompson | Sept. 5, 1944 |
| 2,439,630 | Nutt | Apr. 13, 1948 |